United States Patent [19]

Hallett et al.

[11] 4,203,051
[45] May 13, 1980

[54] CATHODE RAY TUBE APPARATUS

[75] Inventors: Michael H. Hallett, Chandlers Ford; Michael J. Heneghan; Brian R. Sowter, both of Winchester, all of England

[73] Assignee: International Business Machines Corporation, Armonk, N.Y.

[21] Appl. No.: 860,402

[22] Filed: Dec. 13, 1977

[30] Foreign Application Priority Data

Dec. 22, 1976 [GB] United Kingdom ............... 53583/76

[51] Int. Cl.² ............................................. H01J 29/70
[52] U.S. Cl. ................................. 315/13 C; 315/367; 315/368; 315/370
[58] Field of Search ...................... 315/367, 13 C, 370, 315/368

[56] References Cited

U.S. PATENT DOCUMENTS

| 3,422,304 | 1/1969 | Thorpe | 315/367 |
| 3,435,278 | 3/1969 | Carlock et al. | 315/367 |
| 3,465,137 | 9/1969 | Brouillette, Jr. et al. | 315/370 X |
| 3,501,669 | 3/1970 | Henderson | 315/370 |
| 3,714,496 | 1/1973 | Horvath | 315/18 |
| 3,852,640 | 12/1974 | McCarthy | 315/367 X |
| 3,943,279 | 3/1976 | Austefjord | 315/368 X |
| 4,095,137 | 6/1978 | Oswald | 315/367 X |
| 4,099,092 | 7/1978 | Bristow | 315/367 X |
| 4,104,566 | 8/1978 | Shah | 315/367 X |

FOREIGN PATENT DOCUMENTS

1371045 10/1974 United Kingdom .

Primary Examiner—Malcolm F. Hubler
Attorney, Agent, or Firm—Frederick D. Poag

[57] ABSTRACT

A three color gun cathode ray tube has convergence correction signals derived from digital signals stored in a digital data store. The screen of the tube is divided into a plurality of areas and a digital correction signal derived for each area. The system is arranged so that when the three beams are scanning a particular area the digital correction signal associated with that area is read out from the digital store, passed through a digital to analog converter and then applied to the convergence coils of the tube.

11 Claims, 7 Drawing Figures

CATHODE RAY TUBE APPARATUS

FIELD OF THE INVENTION

This invention relates to improvements in cathode ray tube control apparatus and particularly, but not exclusively, to control apparatus for three color beams in a delta gun cathode ray tube.

BACKGROUND OF THE INVENTION

The need to present an undistorted image to the viewer of a cathode ray tube (CRT) presents problems to the designer of the control apparatus. The image is formed by scanning an electron beam over the tube face, a face which may be curved, but does not have the same radius as the apparent radius of the electron beam. In a single beam tube, this results in what is known as pin-cushion distortion, a pinching inwards of the scan at the center of the edges of the image, and an elongation at the corners. Because the gun in a single beam tube is aligned along a central axis of the tube pin-cushion distortion is symetrical about a center point of te screen.

Distortion of the image is aggravated in a three beam color tube, as of necessity the three guns are displaced from each other and each color produces its own displaced pin-cushion raster on the screen. The three beams may, without correction, converge on one spot in the center of the screen but equal horizontal and vertical deflection of the three beams results in a divergence of the beams as well as a displaced pin-cushion effect.

Consequently, two distortions have to be corrected before an image is acceptable to a viewer; first the pin-cushion effect and secondly the convergence of the three beams so that they present an aligned image.

Both pin-cushion and convergence distortion are well known in the art and there have been many solutions proposed and used for the correction of distortions in both monochrome and color CRTs. In "Colour Television Theory" by G. H. Hutson published by McGraw-Hill, London, chapters 6 and 7 deal in some detail with convergence and raster shape correction circuitry.

Many of the solutions used to correct distortion derive a correction waveform from either the field deflection current or the line deflection current which is adjusted by a series of potentiometers to achieve the best correction. The correction waveform is then applied to a set of correction or convergence coils usually placed on the gun side of the main deflection coils. While analog correction techniques can give a satisfactory picture in the center and a large area of the screen, there tends to be a portion of the screen around the edges in which the images in a three gun color tube diverge. This divergence in a CRT used for domestic viewing may be acceptable and not easily noticeable when the image is viewed from a distance of 2 meters or more, but when a CRT is used for displaying alphanumeric data, and where the viewer is the operator of a display terminal viewing from a distance of under 1 meter, divergence at the edges becomes a significant factor.

The use of digital techniques to correct for distortion is known as is shown in UK Patent Serial No. 1,371,045 in which pin-cushion or trapezium distortion is corrected by using a correction waveform derived through a decoder from a stepping register. The digital system described in UK Patent No. 1,371,045 is applied only to a monochrome CRT and is not susceptible to adjustment when the CRT is in use.

SUMMARY OF THE INVENTION

An object of the invention is to provide a cathode ray tube apparatus having an improved beam control.

Another object of the invention is to provide improved apparatus as aforesaid wherein digitally stored correction information is employed advantageously to effect more accurate beam control.

Still another object of the invention is to provide improved apparatus as aforesaid wherein the stored beam correction information is applied to the control selectively according to the area of the cathode ray tube screen being scanned.

Other objects of the invention are to provide correction as aforesaid to the beams of a multibeam cathode ray tube, such as a color tube.

According to the invention there is provided cathode ray tube control apparatus comprising means to apply a correction factor signal to a cathode ray tube having at least one set of deflection coils, each of said correction factor signals being calculated to correct for distortions of the cathode ray tube beam or beams when an associated one of a plurality of areas of the cathode ray tube screen is scanned, a digital data store for storing the correction factor signals for each area of the screen in digital form and means for reading out digital correction factor signals from the digital data store when the associated area of the screen is scanned and converting the digital signal to analog form before it is applied to the deflection coils of the cathode ray tube.

The foregoing and other objects, features and advantages of the present invention will be apparent from the following description of a preferred embodiment of the invention as illustrated in the accompanying drawings.

DETAILED DESCRIPTION

In general terms the screen of a CRT is divided into a plurality of zones—64 in the preferred embodiment—and a fine correction current, which when added to a basic horizontal and vertical correction waveform will correct any distortion, is derived for each zone. The values of the fine correction currents are stored in a digital store. The read out of the digital store is synchronized with the line and frame scan of the CRT so that when the beam or beams are directed toward a particular zone, the associated fine correction current value is read from the store, the value applied to a digital to analog converter (DAC) and the resulting correction current added to a basic horizontal and vertical correction waveform which is applied to the convergence coils of the CRT.

That is when the deflection of the CRT is controlled by applying currents to deflection coils. Of course when an electrostatic deflection system is used then the correction factor signal is applied to the electrostatic deflection plates.

The correction current may be used to correct pincushion distortion in a monochrome single beam CRT, but in the preferred embodiment it is used to correct for convergence in a three beam delta gun color CRT.

The CRT of the preferred embodiment is used in an alphanumeric-graphic display terminal which is connectable to a data processing system. The terminal includes the CRT as an output display device and a keyboard which is used as an input divide to the system. The terminal may also include a light pen which is used to answer questions displayed on the screen by pointing to an appropriately displayed answer. An operator will normally use the display terminal in an interactive mode, that is for any data entered at the terminal keyboard a response will be displayed on the CRT screen within seconds rather than minutes of the input. The operator normally views the screen from a distance less than 1 meter so it can be appreciated that any distortion of the image of characters presented will quickly become an irritant.

Figure 1A:
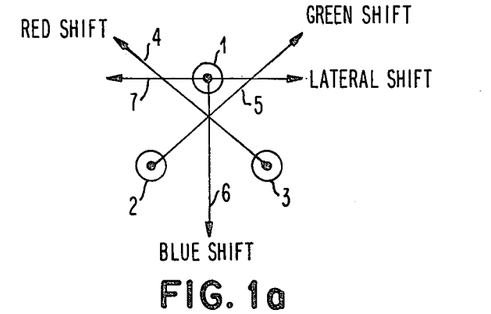
FIGS. 1a and 1b taken together illustrate steps in converging a three beam delta color CRT.
Figure 1B:
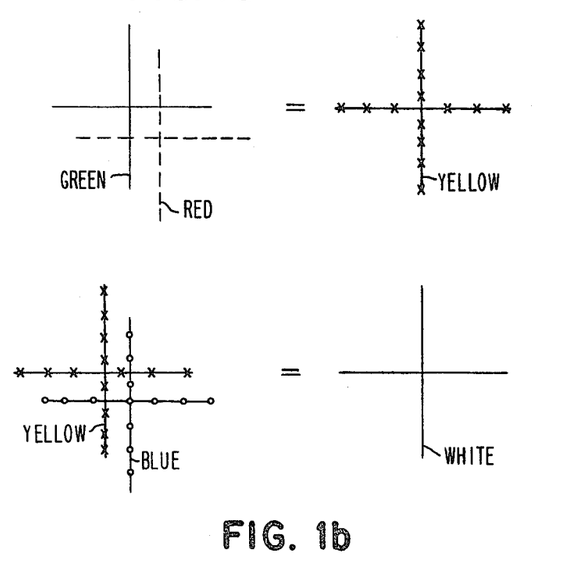

Referring now more particularly to the drawings in which when the same component appears in more than one figure it is referred to by the same reference numeral throughout:

FIGS. 1a and 1b taken together illustrate diagramatically the alignment of the three electron beams in a delta gun arrangement. FIG. 1a shows the three guns 1, 2 and 3, Blue, Green and Red respectively, with the arrows indicating the line of movement for alignment of each beam. Thus, as viewed in plan on the drawing the red beam may move along arrow 4, the green along arrow 5 and the blue along arrow 6. The lateral shift coil of the CRT moves the blue along arrow 7.

The alignment steps are illustrated in FIG. 1b. The first step is to display a grid or pattern using the red and green beams only. A zone of the screen is selected and the convergence of the red and green pattern in that zone examined. If there is divergence then a correction current is generated; in the FIG. 1b example, this will move the red and the green beams until they coincide giving a yellow cross. The next step is to display the grid with the blue beam. If there is divergence then the first step is to move the blue either up or down so that the horizontal lines of the grid are aligned. This is the blue shift along arrow 6 of FIG. 1a. When the horizontal lines are white, then a lateral shift current is generated moving the vertical blue line along arrow 7 of FIG. 1a. A correctly converged pattern then gives a white image.

Four correction currents are generated, a red shift, green shift, blue shift and lateral shift, for each zone of the screen, and each must be applied to its appropriate convergence coil when the associated zone is being scanned by the three beams.

Figure 2:
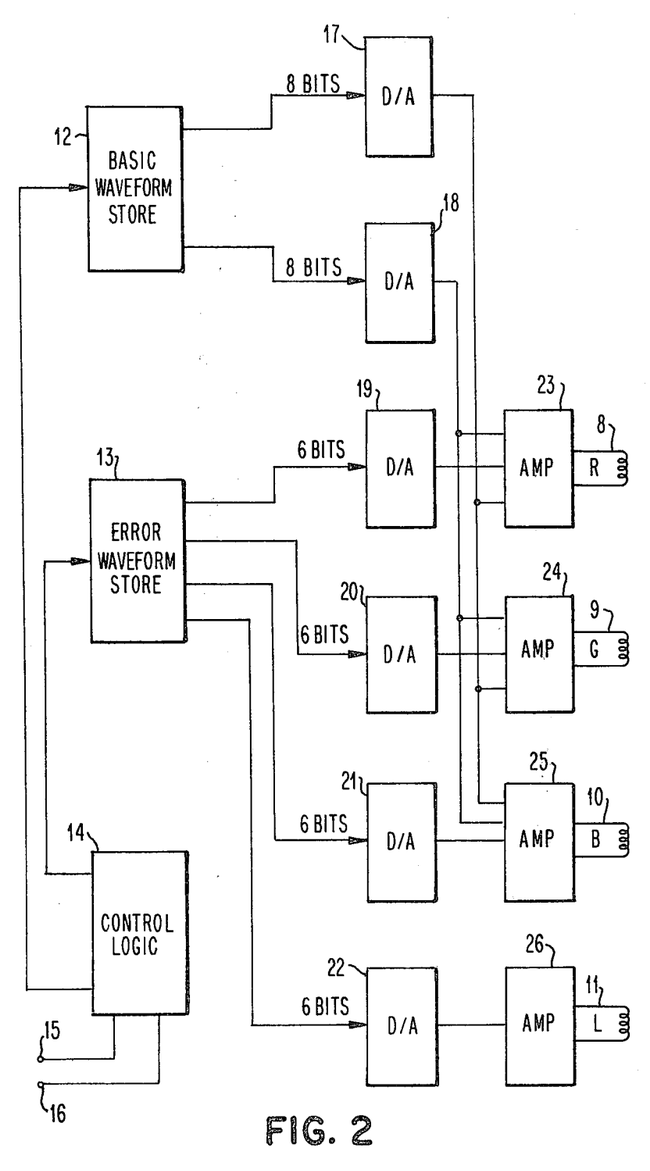
FIG. 2 is a block schematic diagram of the control apparatus used in the preferred embodiment.

FIG. 2 shows in block form the control apparatus of the preferred embodiment for achieving this requirement. A cathode ray tube (not shown) has three electron guns, red, green and blue arranged in a delta configuration as indicated at 3, 2 and 1 respectively in FIG. 1. Each gun has an associated convergence coil 8, 9, and 10 which controls the scanning of the associated gun. A fourth convergence coil 11 controls the lateral shift of the blue beam. In operation, these effects are in addition to those caused by the main horizontal and vertical deflection coils, not shown.

A digital store 12 contains in digital form information for deriving the basic waveform which controls the convergence of all three color beams. This waveform has two components horizontal (Ih) and vertical (Iv) and is applied to the red, blue and green convergence coils equally. A second digital store 13 contains information for deriving the correction currents for each of the four convergence coils (Ir, Ib, Ig and Il). The read out and writing of information into the stores 12 and 13 is controlled by a control logic unit 14 which has two inputs 15 and 16 which receive synchronizing inputs from the line and frame scan circuits of the CRT. Such synchronizing circuits are well known in television and display units employing a raster scan, and are therefore not shown.

Six digital to analog converters 17-22 receive the outputs from the digital stores and convert these digital outputs to analog currents. DAC's 17 and 18 produce the currents which form the basic convergence waveform. DAC 19 produces the red correction current, DAC 20 produces the green correction current, DAC 21 produces the blue correction current and DAC 22 produces the lateral shift correction current.

An amplifier 23 receives inputs from DAC's 17, 18 and 19 and produces the waveform which is applied to the red convergence coil 8. Amplifier 24 receives inputs from DAC's 17, 18 and 20 and produces the waveform which is applied to the green convergence coil 9. Amplifier 25 receives inputs from DAC's 17, 18 and 21 and produces the waveform which is applied to the blue convergence coil 10. Amplifier 26 receives an input from DAC 22 and produces the waveform which is applied to the lateral shift convergence coil 11. The amplifiers may be of any suitable kind, such as summing or power operational amplifiers which product resultant outputs according to the inputs shown.

Figure 3:
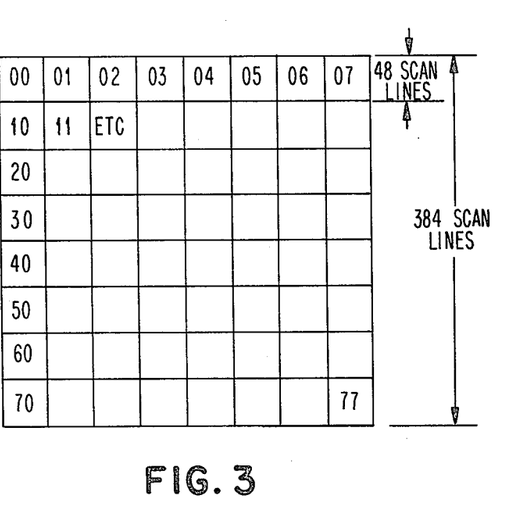
FIG. 3 is a diagramatic illustration of the screen of a CRT.

In the preferred embodiment the screen of the CRT is divided into 64 correction areas. This is illustrated in FIG. 3 with the areas numbered 00-07, 10-17, 20-27, 30-37, 40-47, 50-57, 60-67 and 70-77. The areas are divided into horizontal and vertical zones. In the embodiment, the CRT scans the screen 384 times for each frame so that each horizontal zone is scanned by 48 lines and each vertical zone for one eighth of each line scan. The time taken for one frame scan in 16.6 ms and the frame flyback time is 0.3 ms.

Figure 4:
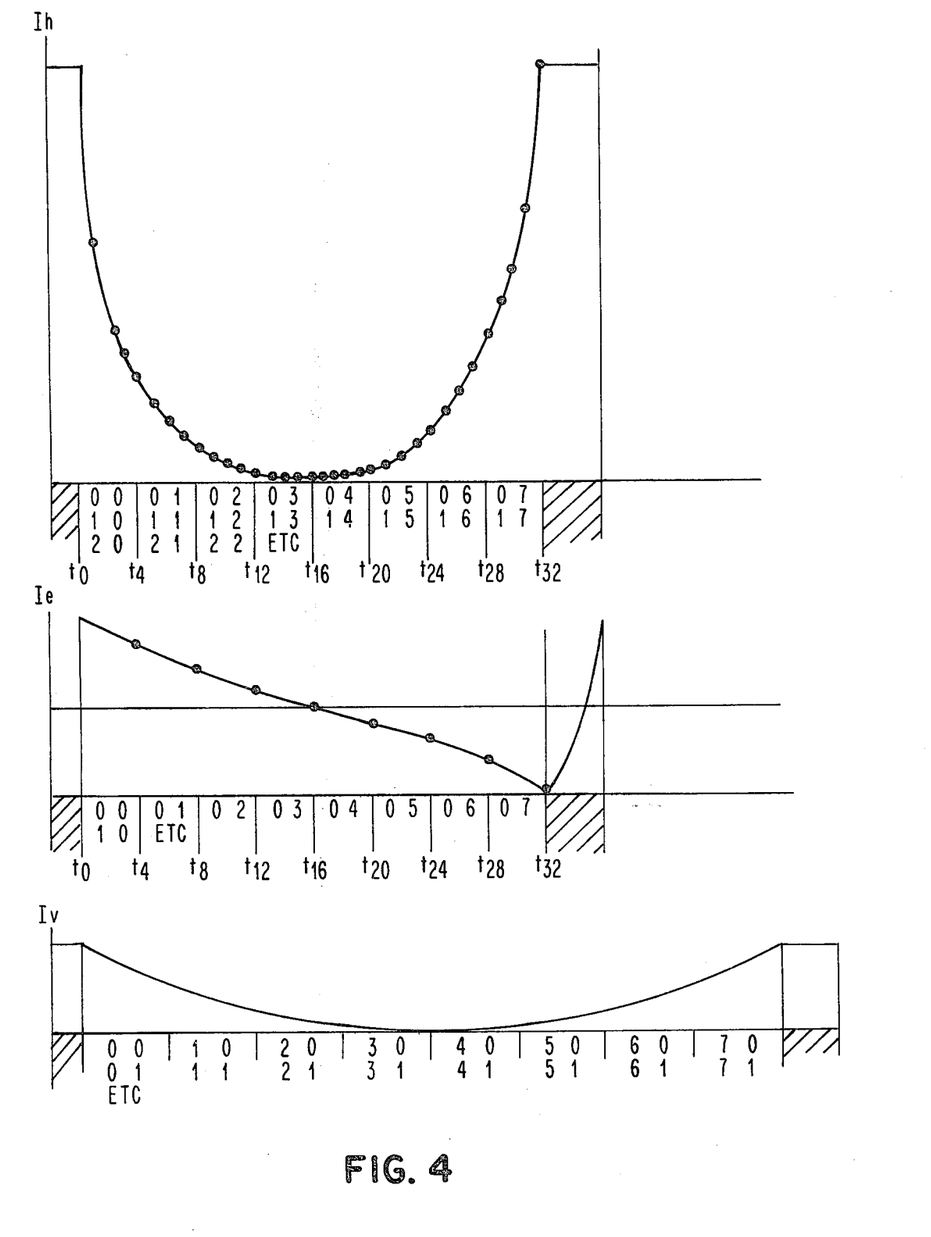
FIG. 4 shows examples of waveforms generated by the apparatus of FIG. 2.

FIG. 4 shows in idealized form examples of the current waveforms generated by the DAC's of FIG. 2. The waveform Ih shows the current output of DAC 17. This waveform is generated once for every line scan by applying 32 eight bit bytes to DAC 17 in time sequence $t_1$-$t_{32}$.

The 32 eight bit bytes are stored in the basic waveform store 12 (FIG. 2) and their read out is controlled by the control logic unit 14 and synchronized with the line scan impulse received on input 15. At the end of each line scan at time $t_{32}$ the final byte sets the current value in DAC 17 to that required for the beginning of the next line scan.

The horizontal waveform Ih of FIG. 4 is divided to show its value as the line passes through the correction areas, this will be the same for all areas in each vertical zone.

The waveform Iv (FIG. 4) is the basic vertical current waveform and is generated by DAC 18. This waveform is generated once for every frame scan from a second set of 32 eight bit bytes stored in the basic waveform store 12. The read out of this set of digits is controlled by the control logic unit 14 and synchronized with the frame scan impulse received on input 16. As with the horizontal waveform the $32^{nd}$ byte sets DAC 18 to the current value required at the start of a frame scan.

As there are 32 bytes for generating Iv there will be four changes in Iv for each horizontal zone then the changes will occur every 12th line. That is, the control logic 14 ensures that a new vertical waveform byte is read from the basic waveform store 12 once per twelve line scans.

Waveform Ie of FIG. 4 is an example of one of the error waveforms Ir, Ig, Ib or Il that are generated by DAC's 19-22 for one of horizontal zones. This waveform is generated from eight six bit bytes stored in error waveform store 13. Each byte relates to the correction current required for an associated correction area and is read from the store 13 under control of control logic 14 when the line scan enters the associated area. As there are 48 lines in each horizontal zone each particular waveform Ie will be generated 48 times for each frame scan. Control 14 can include line and position counters, well known in digitally controlled displays, to effect the described addressing of the stores.

The timing of the read out of the error waveform bytes from store 13 is similar to that of the horizontal waveform Ih bytes from store 12. Except that as only eight bytes are used they occur at $t_4$, $t_8$, $t_{12}$, $t_{20}$, $t_{24}$, $t_{28}$, and $t_{32}$. The byte read at $t_{32}$ sets the value of Ie for the beginning of the next bit scan.

The shaded portions between $t_{32}$ and $t_0$ in waveforms Ih and Ie indicate the line flyback time and the shaded portion in Iv indicates the frame flyback time.

In a typical application the amplitude of the current Ih waveform varies between 0 and 140 ma and the Ie waveform between +30 ma and −30 ma.

Figure 5:
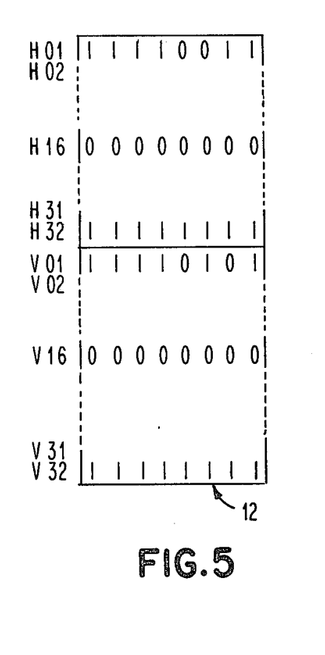
FIGS. 5 and 6 show diagramatically the contents of a digital store used in the preferred embodiment.

FIG. 5 shows in diagramatic form the contents of the basic waveform store 12. The store has sixty-four eight bit locations divided in two lots of 32. H01-H32 are the bytes concerned with the horizontal waveform Ih and V01-V32 are the bytes concerned with the vertical waveform Iv.

The control logic 14 controls the read out of the basic waveform store so that H01 is read out to DAC 17 at time $T_1$, H02 at time $t_2$, etc. V01 is read out to DAC 18 at the start of the first line scan and V02 at the start of the twelveth line scan, V32 is read out at the start of the 372nd line scan.

The contents of bytes H01, H16, H32, V01, V16 and V32 are shown as examples of the way the digits can vary over the generation of each waveform Ih and Iv.

As the waveforms Ih and Iv may usually be determined for each CRT during manufacture the contents of the waveform store 12 are also determined during manufacture and entered by way of control logic unit 14. It is not envisaged in the present embodiment that an operator will need to change the shape of the waveforms Ih and Iv, consequently means for changing the bytes H01-H32 and V01-V32 are not shown although it will be apparent to anyone skilled in the art after reading the discussion below on the entry of the Ie bytes how this can be done.

Of course, the value of the bytes in terms of 1's and 0's will depend upon the DAC's used in the circuit of FIG. 2 and although H32 and V32 are both shown as all 1's, the current delivered by DAC's 17 and 18 in response to these inputs will depend upon the required maximum values of Ih and Iv.

Figure 6:
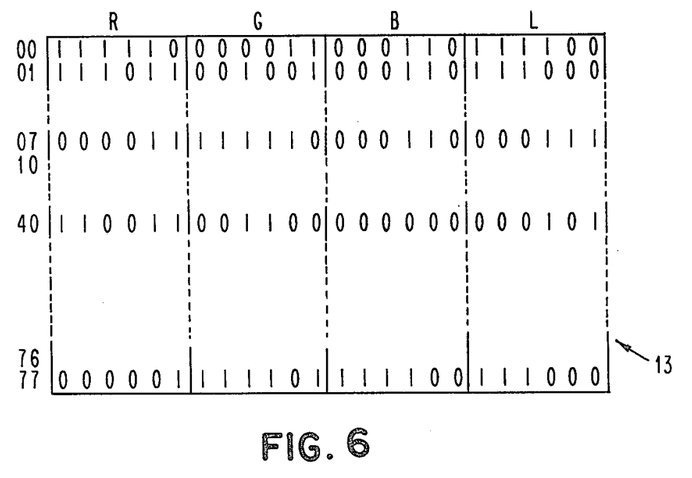

FIG. 6 shows in diagramatic form the contents of the error waveform store 13. The store has sixty-four 24 bit word locations, each one associated with a respective area on the CRT screen. In the figure, the locations are numbered 00-07, 10-17 . . . 70-77 as are the screen areas shown in FIG. 3. Each word location is divided into four six bit bytes associated respectively with the Red DAC 15, Green DAC 20, Blue DAC 21 and Lateral DAC 22.

The read out of the store 13 is controlled by control logic unit 14 so that whenever the line scan directs the beam to area 00 then word 00 is read. Thus, when the first horizontal zone is being scanned, then words 00-07 are read out seccessively 48 times. When the second horizontal zone is being scanned then words 10-17 are read out successively 48 times, and so on through the store until the final horizontal zone is scanned and words 70-77 are read out.

In FIG. 6 words 00, 01, 07, 40 and 77 are shown with sample contents. These are by way of example only and as with the contents of store 12 (FIG. 5) and will in practice depend upon the design of the DACs used and the current variations required for fine convergence of the color beams. It may be noted however, that for any one zone, the red and the green current values may be reversed one starting positive and going negative and the other starting negative and going positive. The blue value for any horizontal zone may stay the same throughout the entire line scan, and be reversed between the first and the eighth horizontal zone.

Figure 7:
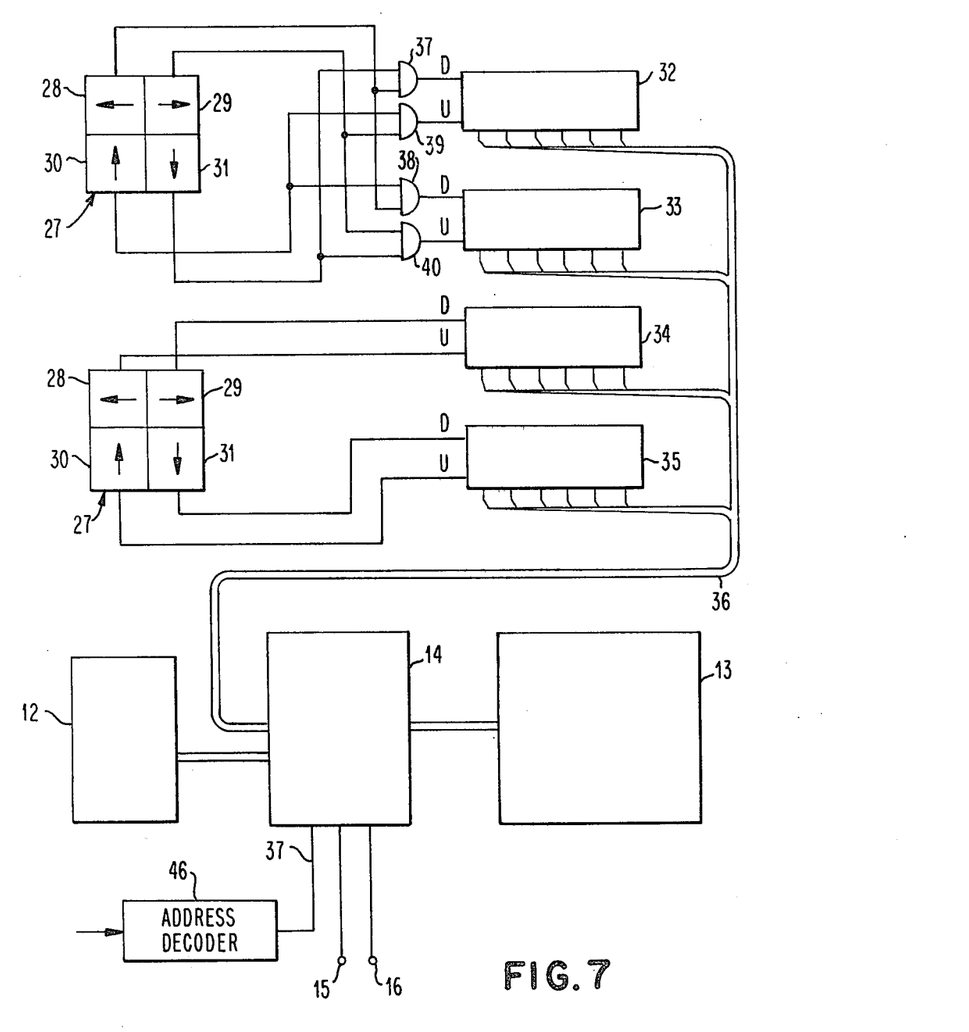
FIG. 7 is a block schematic diagram of apparatus used to enter digital data into the stores used in the preferred embodiment.

In the preferred embodiment, the contents of the store 13 may be entered by an operator using the CRT display terminal. FIG. 7 shows in block schematic form the apparatus for adjusting the word content.

The keyboard of the CRT display has a four way set of toggle keys 27 shown twice in FIG. 7 for ease of explanation. The keys 28 and 29 are for horizontal left and right shifting, the keys 30 and 31 are for vertical up and down shifting.

Four UP/DOWN counters 32-35 are associated respectively with Red, Green, Lateral and Blue shifts. The counters each have six digit positions and are connected through cable 36 to the control logic unit 14. The control logic unit 14 is in turn connected to the error waveform store 13.

The toggle keys 27 are shown twice, as in order to perform the cnvergence method as explained with reference to FIGS. 1a and 1b above two distinct alignments are made.

In the first alignment when the red and green grids are displayed then horizontal left key 28 is connected through OR gate 37 to the down input of red counter 32 and through OR gate 38 to the down input of green counter 33. Horizontal right key 29 is connected through OR gate 39 to the up input of red counter 32 and through OR gate 40 to the up input of green counter 33. Vertical up key 30 is connected through OR gate 39 to the up input of red counter 32 and through OR gate 38 to the down input of green counter 33. Vertical down key 31 is connected through OR gate 37 to the down input of red counter 32 and through OR gate 40 to the up input of green counter 33.

In the second alignment step when the aligned red/green or yellow grid is displayed with the blue then key 28 is connected to the up input and key 29 is connected to the down input of the lateral counter 34, key 30 is connected to the up input and key 31 to the down input of blue counter 35.

An address decoder 46 receives an input from the terminal keyboard indicating which area of the screen the operator is converging, thus input is decoded and passed to the control logic on cable 37.

In operation the operator issues a command at the terminal for the CRT to display a red and green grid pattern. The waveforms Ih and Iv will be automatically generated by control logic 14 and provide a basic convergence waveform. The operator then selects an area which requires fine convergence. The address of the area is passed to address decoder 46 and on to control logic 14. The control logic now knows that any updates received from the counters relate to this area. If, for example, the area 01 is chosen then the present contents of the word 01 are read out from store 13 and placed via cable 36 in the counters 32, 33, 34, 35 setting them to an initial value.

Depending upon the mis-convergence of the red and the green grid in the area 01 the operator presses keys 28–31 incrementing or decrementing counters 32 and 33. Each time a key is pressed and the contents of the counters change so the control logic alters the contents of the word 01 in store 13. This in turn means that the output of DAC's 19 and 20 are changed and the operator can see the way the beams are moving in response to the input. When the operator is satisfied that the red and green beams are converged to give a yellow grid in the area 01, a second command is entered at the deyboard to instruct the terminal to display the blue grid as well as the converged red and green. Pressing of the keys 28–31 now changes the contents of the counters 34 and 35. It is usual first to converge for horizontal alignment using up down keys 30 and 31 and altering the contents of counter 35. The final step is to align vertically using keys 28 and 29 and altering the contents of counter 34.

When the operator is satisfied with the convergence in one area, a second or further area is then selected and the procedure carried out again.

It should be noted that when the convergence of one area is completed, changes in an adjacent area do not affect it, as the currents Ir, Ia, IB and IL generated from DAC 19, 20, 21 and 22 only depends upon the digital contents of the word in store 13 associated with that area.

When the CRT is set up originally, of course, there are no digits stored in the error waveform store 13, and as each area is selected the counters 32–35 are set to all 0's and the initial alignment is made by incrementing these values.

In the embodiment described above each zone occupies the same area of screen and because the operator will usually aim to achieve best convergence at the center of an area discontinuities may be apparent between adjacent zones. The major changes in convergence are at the upper and lower extremities of the screen and in order to achieve a greater smoothing the zones can be banded so that there are fewer lines in the outer horizontal zones and more in the center. One example is that zone 01 has 20 lines
10 has 30 lines
20 has 50 lines
30 has 92 lines
40 has 92 lines
50 has 50 lines
60 has 30 lines
70 has 20 lines Of course the choice of the number of lines per zone will depend upon the type of CRT employed and also on the total number of line scans per frame.

In the above description control logic unit 14 performs standard digital data processing control functions and consequently has not been described in detail. The operation can be summarized as follows:

1. Initially the operator selects a zone on the screen that is to be adjusted. The address decoder receives a signal from the operator and alerts the control unit 14 to display a cross at that location.
2. When control unit 14 receives the zone address from address decoder 46 it fetches the data from the error waveform store 13 and loads it into the registers 32–35.
3. When the cross is displayed at the requested zone and the data is loaded into the registers, the buttons 28–31 can then be used to change the content of the registers 32–35.
4. Each time the beam reaches the end of a frame and during the frame flyback time, the control unit 14 reads from the registers 32–35 and loads the content into the error waveform store 13. Thus any adjustment made during one frame time will affect the display on the next frame time.

It should also be apparent to anyone skilled in the art, how the use of toggle keys 27 is switched between counters 32, 33 and 34, 35 during the alignment stages, one method would be to use AND gates enabled for the particular alignment stage.

In the embodiment described above, the storage of the digital form of the correction waveform is divided into three distinct portions, it should be apparent that other forms of digital storage can be used, for example if sufficient digital storage is available a single word may be used for each color and lateral coil which gives a combined horizontal, vertical and fine correction current when applied to a suitable digital to analog converter.

Also, while the preferred embodiments have been described in terms of a raster scan display system, it will be appreciated that the principles of the invention could also be applied to displays having other scanning systems. For example, some alphanumeric displays employ "wiggle beam" techniques, such as those having a small individual raster or a cursive motion of the beam at each character position. Other alpha-numeric displays, as well as vector graphic displays often utilize the so called "directed beam" technique whereby the CRT electron beam executes a trace defined by vector end point CRT screen addresses. Still other displays use a spiral raster system. Addresses can be specified by X, Y rectangular coordinates or polar coordinates, in either relative (delta) or absolute terms, as may be convenient. In any case, the position of the beam is known or can be derived so that stored error information can be fetched and applied to the beam deflection circuits in accordance with the principles of this invention.

The digital stores used in the preferred embodiments can be a commercially available RAM integrated storage chip such as is used in small or micro digital data processors. The various control functions of logic 14, including storing, fetching and applying digital values as above described can be implemented conveniently by the processor or other control logic included in or associated with the CRT display. Such control facilities are well known in digital displays for affecting various operations in synchronism with the display raster, e.g. character generation, cursor location, special effects, etc.

While the invention has been particularly shown and described with reference to a preferred embodiment thereof, it will be understood by those skilled in the art that various changes in form and detail can be made without departing from the spirit and scope of the invention.

What is claimed is:

1. Cathode ray tube control apparatus comprising:
   means to apply a correction factor signal to a cathode ray tube having at least one set of deflection means, each of said correction factor signals being calculated to correct for distortions of the cathode ray tube beam operation when an associated one of a plurality of areas of the cathode ray tube screen is scanned,
   a digital data store for storing the correction factor signals for each said area of the screen in digital form and,
   means for reading out digital correction factor signals from the digital data store when the associated area of the screen is scanned and converting the digital signal to analog from before it is applied to the deflection means of the cathode ray tube, in which
   the correction factor signal for each of said areas of cathode ray tube screen has at least two components, a basic correction signal and a fine correction signal, and
   said digital data store has a first portion for storing in digital form the basic correction signal and a second portion for storing in digital form the fine correction signal.

2. Cathode ray tube control apparatus as claimed in claim 1 in which
   the basic correction signal has two components and said first portion of the digital data store has a first part for storing a horizontal component of the basic correction factor and a second part for storing a vertical component of the basic correction factor.

3. Cathode ray tube control apparatus as claimed in claim 1 in which
   the cathode ray tube is a three gun tube and
   said second portion of the digital data store, stores at least three components of said fine correction signal each associated with a respective one of the three cathode ray tube guns.

4. Cathode ray tube control apparatus as claimed in claim 3 in which
   said deflection means includes a set of convergence coils one for each gun and when the beams are scanning a particular area of the screen each one of the convergence coils receives in analog form the basic correction signal and the associated portion of the fine correction signal.

5. Cathode ray tube control apparatus as claimed in claim 4 in which
   the cathode ray tube includes a lateral shift coil and
   said fine correction signal includes a fourth portion which is applied in analog form to the lateral shift coil when the associated area of the screen is being scanned.

6. Cathode ray tube control apparatus as claimed in claim 3 including modifying means to modify the correction factor signals stored in the digital data store.

7. Cathode ray tube control apparatus as claimed in claim 6 in which the modifying means includes
   a plurality of binary counters each associated with a respective one of the components of the fine correction signal and
   means to change the value of the count in the counters and thus the digital value of an associated portion of the fine correction signal.

8. The method of applying a convergence correction factor signal to a color cathode ray tube having at least one set of deflection means, each of said correction factor signals being calculated to correct for distortions of the cathode ray tube beam operation when an associated one of a plurality of areas of the cathode ray tube screen is scanned, comprising:
   storing the correction factor signals for each said area of the screen in digital form and,
   reading out the digital correction factor digital signals when the associated area of the screen is scanned and converting the digital signal to analog form and then applying it to the deflection means of the cathode ray tube,
   the correction factor for each of said areas having two components, a basic correction component and an error correction component,
   said method further including altering said error correction components during operation of said cathode ray tube, as needed to achieve the desired distortion correction.

9. The method in accordance with claim 8, further including
   placing said error components in counter means, and
   incrementing and decrementing said counter means under user control to adjust the digital values in said counter means as needed to achieve the desired distortion correction.

10. In a display system, the method of providing convergence correction signals to a plural beam color cathode ray tube display which comprises:
    providing and maintaining in digital storage basic digital information defining nominal convergence requirements of said color cathode ray tube with respect to various areas of the screen thereof,
    operating the convergence means of said display in accordance with said information from said basic storage to provide a nominal convergence of said beams, using the result to define digital information characterizing the error in said nominal convergence, and
    using said error information to provide final convergence signals for said display.

11. The method of claim 10 including displaying indicia on the screen of said cathode ray tube in accordance with said basic information,
    providing operator controlled digital error correcting signal generator means,
    using said operator controlled means to generate error correcting digital information for modification of the effect of said basic digital information to provide final convergence of said beams of said cathode ray tube at distributed portions of said screen, and
    preserving the final convergence information in digital storage.

* * * * *